Dec. 27, 1938.  J. F. LANGER  2,141,214
TRACTION WHEEL ATTACHMENT
Filed Jan. 9, 1937
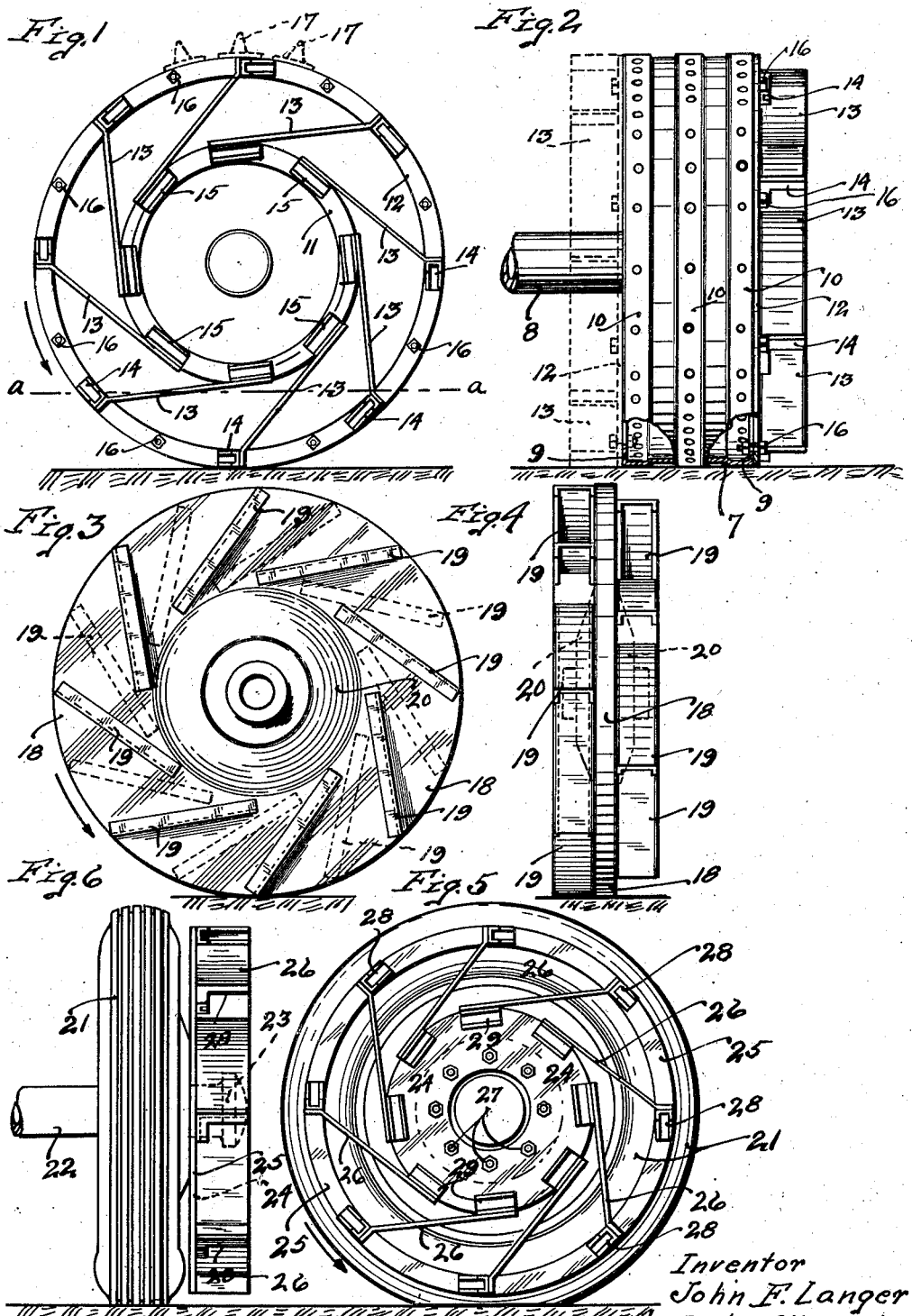
Inventor
John F. Langer
By his Attorneys
Merchant & Kilgore Patented Dec. 27, 1938

2,141,214

UNITED STATES PATENT OFFICE 2,141,214

TRACTION WHEEL ATTACHMENT

John F. Langer, Faribault, Minn.

Application January 9, 1937, Serial No. 119,808

6 Claims. (Cl. 301—38)

My invention provides a simple and highly efficient traction-wheel attachment for tractor wheels, bus wheels, and the like, and, generally stated, consists of the novel devices, combinations of devices and relative arrangement of parts hereinafter described and defined in the claims.

The traction attachment is of such character that when applied to a traction wheel, the attached auxiliary traction devices will have little or no contact with the roadbed or ground when the wheel is run on hard surface, but will come into action whenever the wheel sinks into the ground or roadbed. Moreover, these auxiliary traction devices are of such character that as they are brought into contact with the soft ground, into which the wheel sinks, they will exert a maximum lifting or load-sustaining action, and as they move in the ground and come from the ground there will be a self-clearing action.

In the accompanying drawing several forms of the traction attachment or auxiliary traction device are illustrated.

Referring to the drawing, wherein like characters indicate like parts throughout the several views:

Fig. 1 is a side elevation showing a pair of the auxiliary traction devices applied to the opposite sides of a tractor wheel;

Fig. 2 is a front elevation of the wheel and attachments shown in Fig. 1, one of the traction devices being indicated by dotted lines only, and some parts of the tractor wheel being broken away to show some of the parts in section;

Fig. 3 is a side elevation corresponding to Fig. 1 but showing a pair of traction attachments applied to a traction wheel of somewhat disc-like form;

Fig. 4 is a front elevation of the wheel and attachments shown in Fig. 3;

Fig. 5 is a side elevation showing one of the traction attachments or auxiliary traction devices applied to a pneumatic tire such as, for example, is employed in busses and trucks; and Fig. 6 is a front elevation of the wheel and attachment shown in Fig. 5.

Describing first the device illustrated in Figs. 1 and 2, the numeral 7 indicates a tractor wheel mounted on axle 8, the rim of said wheel being a wide circumferentially corrugated metal shell with marginal inturned side flanges 9 and perforated circumferentially-extended peripheral shallow ribs 10. The auxiliary traction devices here shown are made in rights and lefts for application to opposite sides of the traction wheel; and in this preferred arrangement each auxiliary traction device involves concentric inner and outer rings 11 and 12, preferably made of flat rolled steel. The two rings 11 and 12 are connected by circumferentially spaced traction plates 13 that extend tangentially to the circle struck from the axis of the wheel and which circle in the preferred arrangement is represented by the periphery of the inner ring 11. This general arrangement of the so-called traction plates, as will hereinafter more fully appear, is of great importance in the operation of the traction device. The ends of the traction plates 13 may be rigidly secured to the rings 11 and 12 by various ways, but preferably, as shown, the outer ends, by spot welding, are secured to the ring 12 through the intervention of angle brackets or lugs 14 of channel-like form; and the inner ends of said traction plates are secured to the inner ring 11 by spot welding through the intervention of lugs 15, and the backs of which lugs 15 may be assumed to be electrically welded to said ring 11.

As an efficient and convenient way of rigidly but detachably securing the auxiliary traction devices to the wheel, the outer rings 12 are made of a size to fit against the inturned flanges 9 of the wheel 7 and are rigidly but detachably secured thereto by nut equipped bolts 16.

The operation of the wheel with the attached auxiliary traction devices is substantially as follows: For advance movement of the vehicle, to which the traction wheel is applied, the traction wheels will run in a counter-clockwise direction, in respect to Fig. 1, as the vehicle is being moved from right toward the left in respect to said view. Obviously, when the wheel runs on a hard road the wheel will not sink into the roadbed, the traction plates 13 will not be brought into action and the road will not be marred or damaged by the traction wheel. If, however, the wheel is run over soft ground, through mud or snow, the wheel may sink below the surface line marked a—a, and in that event the traction plates are immediately brought into action.

In their initial contact with the soft upper surface of the ground the plates 13 engage the same almost flatwise, so that a very extended ground-engaging surface is afforded, and under rotation of the wheel the engaged traction plate will have a lifting action which tends to lift the wheel upward in the ground. As the plate moves towards the rear of the wheel its angle to the ground increases and its force is then converted gradually from an upwardly lifting to a forwardly pushing action, so that each traction plate comes out of the ground almost in a vertical position.

Always when the wheel has sunken into the ground to any considerable extent there will be more than one of the traction plates contacting with the ground. The first traction plate to engage the ground moves downward into the ground very slightly until the next traction plate is brought into contact with the ground. Preferably, as shown, the extreme outer ends of the traction plates are turned radially of the wheel so that their forward propelling action is started at a quite early point in its engagement with the ground. The space between the inner ends of the traction plates 13 permits complete clearing of the dirt from between the plates and prevents pocketing and clogging.

In Fig. 1 ordinary traction lugs 17 are shown by dotted lines. These traction lugs are not at all necessary to the present invention but are illustrated to show that they can be applied to a tractor wheel in the usual way, either while my improved auxiliary traction devices are applied or when the latter are removed.

In the structure illustrated in Figs. 3 and 4 the disc-like traction wheel is indicated by the numeral 18, and the traction plates are indicated by the numeral 19. In this structure the wheel 18 may be assumed to be either a hollow or a solid metal structure having laterally projecting hub portions 20. The traction plates 19 in this arrangement are shown as formed from metal channel bars circumferentially spaced and disposed tangentially to the outer portion of the hubs 20. The said traction plates, as shown, are applied on both sides of the traction wheel, and their inner flanges are placed against the adjacent faces of said wheel and are rigidly secured thereto by spot welding or other suitable means. When the traction device is applied at both sides of the wheel 18, the traction plates on the one side should be set slightly ahead or intermediate of the traction plates on the opposite side, as indicated by the full lines and dotted lines on Fig. 3. The advantages derived in the action of this wheel are similar to those more fully disclosed in respect to the wheel illustrated in Figs. 1 and 2.

In the structure illustrated in Figs. 5 and 6 the numeral 21 indicates a pneumatic tire equipped disc-wheel such as is employed on busses and trucks. This wheel 21 is applied on an axle 22 that projects in the form of a hub 23, to which one of my improved auxiliary traction devices is applied, and may be applied as a substitute for the usually provided twin tire and wheel, which latter is assumed to have been removed. The traction device here illustrated is made up of an annular inner plate or ring 24, an outer ring 25 and the traction plates or members 26. In this arrangement the annular plate 24, as shown, is detachably applied around the hub 23 and rigidly but detachably secured to the hub of wheel 21, slightly spaced from the tire of said wheel, by means of a multiplicity of nut equipped bolts 27 such as are usually employed to attach the twin-tire equipped wheel to the wheel 21.

The traction plates 26 are shown as of substantially the same form as those illustrated in Figs. 1 and 2 and in a similar manner are connected to the outer ring 25 at their outer ends by brackets or lugs 28 and at their inner ends are attached to the annular plate 24 by brackets or lugs 29. In this arrangement the traction plates 26 are tangentially secured to the outer portion of said annular plate 24. The operation of the traction device applied, as illustrated in Figs. 5 and 6, is obvious from the foregoing statements. Here attention is called to the fact that the outer portion of the auxiliary traction attachment is of less diameter than the normal diameter of the tire of traction wheel 21, so that it will come into contact with the ground only when the wheel is sunk slightly into the mud, sand or snow of the roadbed or ground. In traveling through deep snowbanks the traction plates will press down the snow into a hard and compact formation so that the lifting forward and propelling action will be produced under rotation of the wheel in a counter-clockwise direction in respect to Fig. 8.

From the foregoing it is evident that the invention herein illustrated is capable of various modifications other than those shown but all within the scope of the invention herein generically disclosed and broadly claimed.

It is important to note that in the structure illustrated in Fig. 3 the diameter of the hub portion 20 is approximately one-half the diameter of the outer portion 18. It will also be noted in the structures illustrated in Figs. 1 and 2 and Figs. 5 and 6 the inner ring is approximately one-half the diameter of the outer ring. This arrangement sets the traction plates at such an angle that under advance movement of the wheel the traction plates will be brought nearly or quite flat wise into contact with soft earth and hence produces a lifting action on the wheel.

What I claim is:

1. An auxiliary traction device for traction wheels comprising concentric inner and outer rings and circumferentially spaced traction plates secured at their outer ends to said outer ring and at their inner ends to the inner ring and extended substantially tangentially to said inner ring.

2. The structure defined in claim 1 in which said traction plates are spaced at their inner and outer ends to render the same self-clearing.

3. The structure defined in claim 1 in which one of said rings is provided with means for detachably securing the same to a traction wheel.

4. The structure defined in claim 1 in which said traction plates are approximately flat elongated members extended inwardly from the outer ring approximately tangential to the periphery of the inner ring.

5. The structure defined in claim 1 in which said traction plates are approximately flat elongated members extended inwardly from the outer ring approximately tangential to the periphery of the inner ring, the said outer ring having means for attachment to the adjacent rim of the traction wheel.

6. The structure defined in claim 1 in which said traction plates are secured to the inner and outer rings by lugs projecting laterally outward from the respective rings.

JOHN F. LANGER.